United States Patent [19]

Yamaguchi et al.

[11] Patent Number: 5,271,950
[45] Date of Patent: Dec. 21, 1993

[54] CHOCOLATE AND CHOCOLATE-UTILIZING FOOD

[75] Inventors: Kotaro Yamaguchi, Sennan; Tsugio Nishimoto, Naga; Yoshitaka Ebihara, Sakai; Hidenobu Matsunami, Sennan; Shohei Fujita, Miyazaki; Aki Kakurai, Makabe, all of Japan

[73] Assignee: Fuji Oil Company, Limited, Osaka, Japan

[21] Appl. No.: 847,364

[22] Filed: Mar. 4, 1992

[30] Foreign Application Priority Data

Mar. 4, 1991 [JP] Japan .................................. 3-63907
Aug. 20, 1991 [JP] Japan .................................. 3-233861

[51] Int. Cl.⁵ .............................................. A23G 1/00
[52] U.S. Cl. ............................... 426/607; 426/660; 426/100
[58] Field of Search ................. 426/607, 99, 100, 101, 426/660

[56] References Cited

U.S. PATENT DOCUMENTS

| | | | |
|---|---|---|---|
| 4,219,584 | 8/1980 | Mori | 426/607 |
| 4,465,703 | 8/1984 | Jasko | 426/607 |
| 4,705,692 | 11/1987 | Tanaka | 426/607 |
| 4,837,109 | 10/1989 | Tanaka | 426/607 |
| 4,847,105 | 7/1989 | Yokobori | 426/607 |
| 4,865,866 | 9/1989 | Moore | 426/607 |
| 4,877,636 | 10/1989 | Koyano | 426/607 |
| 4,882,192 | 11/1989 | Maeda | 426/607 |
| 5,135,769 | 8/1992 | Itagaki | 426/607 |

FOREIGN PATENT DOCUMENTS

| | | | |
|---|---|---|---|
| 189669 | 8/1986 | European Pat. Off. | |
| 199580 | 10/1986 | European Pat. Off. | |
| 273352 | 7/1988 | European Pat. Off. | |
| 2435206 | 4/1980 | France | |
| 0285422 | 5/1988 | Japan | 426/607 |
| 0034065 | 8/1981 | United Kingdom | 426/607 |

OTHER PUBLICATIONS

Patent Abstracts of Japan, vol. 15, No. 506 (C-0804) (Feb. 1991).
Patent Abstracts of Japan, vol. 14, No. 412 (C-0755) (Sep. 1990).

*Primary Examiner*—Carolyn Paden
*Attorney, Agent, or Firm*—Wenderoth, Lind & Ponack

[57] ABSTRACT

There is disclosed a chocolate containing as its oil ingredients 10–85 wt % of di-saturated mono-unsaturated glycerides ($S_2U$) and 15–90 wt % of di-unsaturated mono-saturated glycerides ($SU_2$) plus tri-unsaturated glycerides ($U_3$), at least 35 wt % of the di-saturated mono-unsaturated glycerides ($S_2U$) being di-saturated mono-linoleate ($S_2L$). Chocolate-utilizing food containing this chocolate such as in frozen desserts and the like are also disclosed.

10 Claims, No Drawings

CHOCOLATE AND CHOCOLATE-UTILIZING FOOD

FIELD OF THE INVENTION

The present invention relates to a chocolate containing a relatively large amount of liquid fats More particularly, it relates not only to a chocolate which has excellent flexibility in molding, such as flexing characteristics, but also to a chocolate for use in frozen desserts. It should be noted that the term "chocolate" used herein has a broad meaning which is not limited by a rule (e.g., "Fair Rule for Designation of Chocolates" in Japan) or a legal provision but includes chocolates or fat-fabricated food using, what is called, a cacao butter substitute. Moreover, the term "fat" used herein has the same meaning as that of "fats and oils", including, what is called, fatty oils that are in the liquid state at room temperature.

BACKGROUND OF THE INVENTION

Chocolates which have been most commonly seen on the market are required to have snap characteristics as a matter of importance. Such chocolates usually contain only a small amount of low-melting glyceride components, such as di-unsaturated mono-saturated glycerides ($SU_2$) and tri-unsaturated glycerides ($U_3$), and they are composed mainly of di-saturated mono-unsaturated glycerides ($S_2U$).

On the other hand, there has been known the use of particular chocolates which are required to have moldability rather than snap characteristics as a matter of importance. Typical examples of such chocolates include, what is called, plastic chocolates which can be obtained by blending ordinary chocolates with water-containing materials, such as liquid sugar, and they have been molded into a shape of man, animal or houses for decoration of cakes. However, chocolates using liquid sugar have undesired flavor and also an unfavorable mouth feel. Moreover, such chocolates have difficulty in that water contained therein is evaporated with time and discoloration occurs therewith, whereby blooms appear on their surface and they have a dry and crumbly mouth feel. For this reason, with regard to the conventional plastic chocolates, importance has been attached to the decorating characteristics on their shape rather than the mouth feel thereof. Moreover, the conventional plastic chocolates, although they have high flexibility in molding similarly to the case of clay, have difficulty in handling; for example, they are prone to adhere to fingers and the wall of a vessel.

As another means of providing chocolates with moldability, it can also be considered to blend high- to middle-melting fats with a relatively large amount of liquid fats in place of water. However, for example, when a chocolate mix is solidified in the form of a sheet and then provided with a small strain, the base may be broken or cracked, and because the solidified mix has poor flexing characteristics, they have difficulty in flexible moldability. If an arbitrary shape is desired, there have hitherto been considered only two methods, in which a chocolate mix in the molten state before solidification is poured into a desired mold or put on an object to be coated.

In the case of chocolates used together with frozen desserts, liquid fats are admixed to reduce the melting point of chocolates to prevent extremely poor melting in the mouth, which is caused by the coldness of the frozen dessert portion. To the contrary, the rate of solidification becomes decreased in the steps of coating, filling with a center piece, and molding in a chip or other shapes, and it is, therefore, necessary to make the cooling time longer. However, since there is a limit in the cooling capacity of facilities for the production of frozen desserts, the amount of liquid fats to be used for the production of chocolates for use in frozen desserts is also limited. For this reason, frozen desserts using such chocolates that have a satisfactory soft mouth feel have not yet been on the market.

On the other hand, various kinds of fats for use in chocolates have hitherto been developed. The development is directed to those which are composed mainly of di-saturated mono-unsaturated glycerides ($S_2U$), similarly to cacao butter. However, it has not yet been known that the above problems can be solved by using these kinds of fats in combination with liquid fats For example, GB 2042579 A and EP 273352 A disclose a method in which saturated fatty acids are introduced in 1,3-positions of safflower oil to obtain "SLS"-rich hard butter. It has also not yet been known that the above problems of the prior art can be solved by using these kinds of hard butter in combination with a relatively large amount of liquid fats, as intended by the present invention.

OBJECTS OF THE INVENTION

Under these circumstances, in order to solve the above problems, the present inventors have intensively studied chocolates to improve their flexing characteristics and moldability, and found that a combination of di-saturated mono-linoleates and liquid fats at specific ratios is important for this purpose. As a result of further studies, the present inventors have completed the present invention.

That is, the main object of the present invention is to provide chocolates having excellent flexing characteristics and moldability.

It is further object of the present invention to provide various kinds of chocolate-utilizing food which can be obtained by using the above chocolates.

These objects as well as other objects and advantages of the present invention will become apparent to those skilled in the art from the following description.

SUMMARY OF THE INVENTION

According to the present invention, there is provided a chocolate, the oil ingredient of which comprises 10–85 wt % of di-saturated mono-unsaturated glycerides ($S_2U$) and 15–90 wt % of di-unsaturated mono-saturated glycerides ($SU_2$) plus tri-unsaturated glycerides ($U_3$), at least 35 wt % of said di-saturated mono-unsaturated glycerides ($S_2U$) being di-saturated mono-linoleate ($S_2L$). Unless otherwise indicated, "percents" used hereinafter are by weight (wt %). In addition to these glycerides, the chocolate of the present invention may further contain tri-saturated glycerides ($S_3$) in a predetermined amount, if necessary.

There are also provided various kinds of chocolate-utilizing food, such as those in which an internal material is wrapped up in a sheet of the above chocolate; frozen desserts having a surface which is coated with the above chocolate; and frozen desserts containing the above chocolate as a center piece.

DETAILED DESCRIPTION OF THE INVENTION

The di-saturated mono-unsaturated glycerides which can be used are glycerides ($S_2U$) having two residues of $C_{12-22}$ saturated fatty acids (S) and one residue of unsaturated fatty acids (U). These glycerides may be any of "SSU" in which "U" is bonded at the $\alpha$ position, "SUS" in which "U" is bonded at the $\beta$ position, and mixtures thereof. In these glycerides, those in which the unsaturated fatty acid (U) is linoleic acid (L) are referred to as di-saturated mono-linoleates ($S_2L$). Changes in physical properties of glycerides "$S_2L$" are little over a wide temperature range. However, in comparison with "SLS", glycerides "SSL" are more useful in frozen desserts, combined food (e.g., chocolate-coated ice cream and chocolate chip-containing ice cream) which may be treated in some cases within a wide temperature range, and other kinds of chocolate-utilizing food because they exhibit a smaller change in physical properties than "SLS" even when a temperature change extends over a wide range (e.g., $-20°$ to $25°$ C.). Moreover, glycerides "SSL" are useful because of their excellent drying characteristics which are achieved by using these glycerides in combination with liquid fats.

The di-unsaturated mono-saturated glycerides which can be used are glycerides ($SU_2$) having one residue of saturated fatty acids (S) and two residues of unsaturated fatty acids (U). These glycerides may be any of "USU", "UUS", and mixtures thereof. The chain length of saturated fatty acids (S) may be of 12-22 carbon atoms, which are widely found in constituent fatty acids of hard butter. Hereinafter, tri-saturated glycerides and tri-unsaturated glycerides can be denoted as "$S_3$" and "$U_3$", respectively.

The above glycerides can be obtained either by concentration and fractionation of the corresponding components present in natural fats or oils, or by synthesis. From the economical and practical points of view, the main sources for glycerides "$S_2U$" other than "$S_2L$" are tempering-type hard butter, such as cacao butter, fractionated shea butter, and middle-melting fractions of palm oil; fats that are in the liquid state at room temperature, and low-melting fractions of "$S_2L$"-rich interesterified fats for glycerides "$SU_2$" and "$U_3$"; and extremely-hardened oils and lauric-type oils for glycerides "$S_3$".

"$S_2L$"-rich fats can be obtained by interesterification of fats containing a large amount of linoleic acid, such as safflower oil, sunflower oil, corn oil, rapeseed oil, and soybean oil, particularly the former two, with saturated fatty acids or alcoholic esters of saturated fatty acids according to a known method, followed by fractionation, if necessary. In particular, when interesterification is carried out by a lipase with selectivity toward 1,3-positions, and free fatty acids or their esters with monohydric alcohols are used as the source of saturated fatty acids, the formation of glycerides "$S_3$" can be reduced, so that this method has the advantage in that it is unnecessary to remove them by fractionation of interesterified oils. Moreover, palmitic acid, stearic acid, and their esters with monohydric alcohols are useful sources for saturated fatty acids "S" because of their low cost, and low-melting fractions can be used as the above liquid fats.

For the purpose of providing constant physical properties, particularly moldability at room temperature, constant softness at low temperatures, and high rate of drying, it is particularly important that the composition of the chocolate oil ingredients as described above should meet the following two requirements: the amount of low-melting tri-glycerides, such as di-unsaturated mono-saturated glycerides and tri-saturated unsaturated glycerides, is 15% or more; and the di-saturated mono-unsaturated glycerides contain 35% or more of di-saturated mono-linoleates.

The effects of the glyceride composition of the chocolate oil ingredients on the physical properties are not completely clarified. However, the present inventors assume that di-saturated mono-linoleates remain unchanged as, what is called, $\gamma$-type crystals, which can readily provide a coarse packing structure and, further, the relationship between the amounts of solid and liquid glycerides is closely concerned.

Of course, it is possible to select a more suitable range from the above range according to the factors relating to the purposes of using chocolates, such as molding temperature and eating temperature.

For example, to obtain chocolates having excellent moldability around room temperature, the chocolate of the present invention can comprise as its oil ingredients 30-85% of di-saturated mono-unsaturated glycerides ($S_2U$), 15-70% of di-unsaturated mono-saturated glycerides ($SU_2$) plus tri-unsaturated glycerides ($U_3$), and 0-6% of tri-saturated glycerides ($S_3$), at least 35% of the di-saturated mono-unsaturated glycerides ($S_2U$) being di-saturated mono-linoleates ($S_2L$). More preferably, the chocolate can comprise as its oil ingredients 40-80% of di-saturated mono-unsaturated glycerides ($S_2U$), 20-60% of di-unsaturated mono-saturated glycerides ($SU_2$) plus tri-unsaturated glycerides ($U_3$), and 1-4% of tri-saturated glycerides ($S_3$), at least 40% of the di-saturated mono-unsaturated glycerides ($S_2U$) being di-saturated mono-linoleate ($S_2L$).

Moreover, to obtain chocolates for use in frozen desserts, the chocolate of the present invention can comprise as its oil ingredients 10-70% of di-saturated mono-unsaturated glycerides ($S_2U$), 30-90% of di-unsaturated mono-saturated glycerides ($SU_2$) plus tri-unsaturated glycerides ($U_3$), and 40% or less of tri-saturated glycerides ($S_3$), at least 35% of the di-saturated mono-unsaturated glycerides ($S_2U$) being di-saturated mono-linoleates ($S_2L$). The softening or melting point of the oil ingredients is preferably 27° C. or lower. It is more preferred that the amount of di-unsaturated mono-saturated glycerides ($SU_2$) and tri-unsaturated glycerides ($U_3$) is 50% or more, and 40% or more of the di-saturated mono-unsaturated glycerides ($S_2U$) is di-saturated mono-linoleate ($S_2L$).

To obtain chocolates for use in molding at room temperature, the chocolate of the present invention can comprise as its oil ingredients 30% or more of di-saturated mono-unsaturated glycerides ($S_2U$) and 70% or less of di-unsaturated mono-saturated glycerides ($SU_2$) plus tri-unsaturated glycerides ($U_3$), so that it is easy to maintain the shape of chocolates which have been molded around at room temperature. When the chocolates are molded together with frozen desserts, it is possible to maintain the shape of the chocolates, even if the glycerides are used in an amount within a wider range than the above range.

On the other hand, to obtain chocolates which are used in frozen desserts and eaten as they remain at low temperatures, it is preferred for the purpose of providing a soft mouth feel and good property of melting in the mouth that the chocolate of the present invention may meet the following requirements: the amount of di-saturated mono-unsaturated glycerides ($S_2U$) is 70% or less, and the amount of low-melting triglycerides, such as di-unsaturated mono-saturated glycerides ($SU_2$) and tri-unsaturated glycerides ($U_3$), is 30% or more, based on the total weight of the glycerides; and the softening or melting point of the entire oil ingredients is 27° C. or lower.

Although it is not essential to contain tri-unsaturated glycerides in the chocolate oil ingredients, the presence of tri-saturated glycerides in an amount of 1% or more is preferred because the effect of preventing the exudation of oil ingredients can be increased. In the case of chocolates which have been held at a somewhat elevated temperature over room temperature, the presence of tri-saturated glycerides can make a contribution to the improvement in shape retention of the chocolates, whereas too large amounts of tri-saturated glycerides will have a tendency to inhibit the flexing characteristics of the chocolates around at room temperature.

Moreover, in the case of chocolates for use in frozen desserts, the presence of tri-saturated glycerides, such as extremely-hardened soybean oil or rapeseed oil having a long fatty acid chain, can provide more improvement both in drying characteristics and in shape retention of chocolates molded into chips or other shapes, whereas too large amounts of such tri-saturated glycerides will degrade the property of melting in the mouth. When lauric-type oil having a short fatty acid chain is used, the presence of such a lauric-type oil in an amount of 10–30% can improve the property of melting in the mouth, whereas too large amounts thereof will make the chocolates hardened, so that the softness as a feature of chocolates for use in frozen desserts disappears. The total amount of tri-saturated glycerides acceptable for use in frozen desserts is about 40% or less.

The chocolate ingredients other than the oil ingredients can be those which have been usually used in the art, such as cocoa, saccharides, powdered milk, emulsifying agents, flavors, food colors, and the like. It is also possible to provide unique chocolates with a different flavor from that of ordinary chocolates by use of powdered nuts (e.g., powdered almonds), peanut butter, or powdered cheese, in place of cacao components.

The molding chocolates of the present invention have excellent moldability, such as flexing characteristics, within a temperature range depending upon the composition. Therefore, according to the applications, the chocolates can readily be deformed into any shape by extrusion, rolling with the use of a rolling pin or roller, cutting, or other techniques. For example, the following molding applications are possible: sheet-like chocolates are cut with a die into a leaf-like shape and then made into an ornament having a curved form; sheet-like chocolates are used to display rose flowers therein; sheet-like chocolates are wound on the side wall of a cake; sheet-like chocolates with different colors are laminated and rolled up in a roll-like or spiral shape; and chocolates are extruded into "Kintaro chocolate" which is designed after the model of a Japanese stick candy named "Kintaro ame".

The present invention also includes sheet- or block-like chocolates in which the chocolate oil ingredients have the above triglyceride composition. Further, the present invention includes a method for the production of a chocolate-utilizing food in which an internal material is wrapped up in a sheet-like chocolate thus obtained; and a method for the production of a chocolate-utilizing food comprising the steps of supplying the block-like chocolate having the above triglyceride composition in its oil ingredients together with an internal material, to an encrusting machine; and thereby wrapping the internal material up in the chocolate.

The chocolate for use in frozen desserts of the present invention can be advantageously used for coating on the surface of frozen desserts, such as ice cream bars; used as a center piece for frozen desserts; molded into chips to incorporate into frozen desserts; or coated, as a material for prevention of moisture absorption, on the internal wall of an eatable vessel, such as a corn cup (made from sugar corn and also referred to as "sugar corn cup") for filling frozen desserts therein, or a cover of bean-jam-filled wafers.

As described above, the present invention also includes a frozen dessert having a surface which is coated with a chocolate for use in frozen desserts of the present invention; a frozen dessert filled with a chocolate for use in frozen desserts of the present invention as a center piece; an eatable vessel in which a layer of a chocolate for use in frozen desserts of the present invention is provided on the internal wall of a vessel, such as a corn cup or a cover of bean-jam-filled wafers; and a frozen dessert into which chips of a chocolate are incorporated for use in frozen desserts of the present invention.

PREFERRED EMBODIMENTS OF THE INVENTION

The following examples further illustrate the present invention in detail but are not to be construed to limit the scope thereof. Unless otherwise indicated, the "parts" are by weight.

EXAMPLES 1–6

20 Parts of safflower oil and 80 parts of ethyl stearate were interesterified with a lipase having 1,3-specificity, and the reaction mixture was subjected to removal of ethyl ester portions by distillation. The resulting Fat No. 1 was subjected to a single step fractionation to obtain a high-melting fraction (Fat No. 2) with a yield of 60%. Fat No. 1 had the triglyceride composition: $S_2L$, 48.3% ($St_2L$, 42.0%; "St" = stearic acid); other $S_2U$, 6.6%; $SU_2+U_3$, 44.5%; and $S_3$, 0.6%. Fat No. 2 had the triglyceride composition: $S_2L$, 76.9% ($St_2L$, 70.5%); other $S_2U$, 14.3%; $SU_2+U_3$, 8.8%; and $S_3$, 1.0%.

Then, Fat No. 2, cacao oil (having the triglyceride composition: $S_2L$, 5.9%; other $S_2U$, 80.1%; $SU_2+U_3$, 13.0%; and $S_3$, 0.9%), soybean oil, and extremely hardened rapeseed oil were blended at various ratios to prepare test oils. The oil ingredient ratios of the respective test oils are as shown in Table 1.

TABLE 1

| | Fat No. 2 (wt %) | Cacao oil (wt %) | Soybean oil (wt %) | Extremely hardened rapeseed oil (wt %) |
|---|---|---|---|---|
| Comparative Example 1 | 98 | | | 2 |
| Example 1 | 83 | | 15 | 2 |
| Comparative Example 2 | 78 | 20 | | 2 |
| Example 2 | 66.4 | 16.6 | 15 | 2 |
| Comparative Example 3 | 23 | 45 | 30 | 2 |
| Example 3 | 35 | 33 | 30 | 2 |
| Example 4 | 49 | 20 | 29 | 2 |
| Example 5 | 30 | 10 | 58 | 2 |

TABLE 1-continued

|  | Fat No. 2 (wt %) | Cacao oil (wt %) | Soybean oil (wt %) | Extremely hardened rapeseed oil (wt %) |
| --- | --- | --- | --- | --- |
| Comparative Example 5 | 12 |  | 86 | 2 |
| Example 6 | 50 | 20 | 30 | 0 |
| Comparative Example 6 | 47 | 19 | 28 | 6 |

The above test oils were used to produce sheet-like chocolates which were then subjected to the test for flexing characteristics. Namely, 20.8 parts of cocoa, 49.4 parts of powdered sugar, 29.8 parts of one of the test oils, 0.5 parts of lecithin, and 0.02 parts of vanillin were blended to form a chocolate base. The resulting mix was solidified at 5° C. with no tempering operation, and cut into a thin plate-shaped or sheet-like chocolate measuring 5 cm square and having a thickness of 2 mm.

The test for flexing characteristics was carried out in the following manner. The sheet-like chocolate was allowed to stand at 20° C. for a week, after which both ends of the chocolate were hold with hands to bend it in such a manner that the tangent angle of both ends became 90 degrees. The flexing characteristics were evaluated according to the following criteria:
A: no cracks; B: cracked; C: broken.

The glyceride composition of the respective chocolates and the results of the test for flexing characteristics are shown in Table 2 below.

TABLE 2

|  | Glyceride composition (wt %) | | | | Test results | |
| --- | --- | --- | --- | --- | --- | --- |
|  | $S_2U$ | $SU_2 + U_3$ | $S_3$ | $S_2L$ in $S_2U$ | Flexing characteristics | Shape retention at 25° C. |
| Comparative Example 1 | 89.1 | 8.0 | 2.9 | 79.0 | C | good |
| Example 1 | 76.4 | 20.8 | 2.7 | 78.1 | B | good |
| Comparative Example 2 | 88.1 | 9.0 | 2.9 | 64.9 | C | good |
| Example 2 | 75.6 | 21.6 | 2.7 | 64.6 | B | good |
| Comparative Example 3 | 61.5 | 35.9 | 2.6 | 31.5 | C | good |
| Example 3 | 62.2 | 35.3 | 2.6 | 43.9 | B | good |
| Example 4 | 63.6 | 33.8 | 2.6 | 57.4 | A | good |
| Example 5 | 39.5 | 58.2 | 2.3 | 56.7 | A | bad |
| Comparative Example 5 | 16.3 | 81.7 | 2.1 | 55.2 | (not solidified) |  |
| Example 6 | 64.4 | 34.9 | 0.7 | 57.8 | A | bad |
| Comparative Example 6 | 61.1 | 32.6 | 6.3 | 57.3 | C | good |

As seen from a comparison of Example 1 and Comparative Example 1 and a comparison of Example 2 and Comparative Example 2, the chocolates containing a small amount of $SU_2+U_3$ in the oil ingredients were easily broken in the test for flexing characteristics. To the contrary, as seen from a comparison of Examples 4, 5 and Comparative Example 5, an increase in the amount of $SU_2+U_3$ degraded the shape retention at 25° C., and it was impossible in an extreme case to obtain a solidified chocolate.

Moreover, as seen from a comparison of Comparative Example 3 and Examples 3, 4, a large amount of $S_2L$ in $S_2U$ was required for improvement in the flexing characteristics.

Further, too large amounts of $S_3$ in the oil ingredients gave poor flexing characteristics, whereas too small amounts thereof degraded the shape retention.

EXAMPLE 7

60 Parts of soybean extremely hardened soybean oil and 40 parts of safflower oil were interesterified with sodium methylate, and the reaction mixture was fractionated with hexane to obtain a middle-melting fraction with a yield of 40%. This fat had the triglyceride composition: $S_2L$, 76.2%; other $S_2U$, 13.8%; $SU_2+U_3$, 9.0%; and $S_3$, 1.0%. Then, using this fat, a sheet-like chocolate was produced in the same manner as that of Example 4. The resulting chocolate had excellent flexing characteristics.

EXAMPLE 8

78.0 Parts of Fat No. 1 as described above, 20.0 parts of cacao oil, and 2 parts of extremely hardened rapeseed oil were used to produce a block-like chocolate. The glyceride composition, in terms of oil ingredients, was similar to that of Example 4.

Then, the block-like chocolate was extended with a rolling pin to have a sheet-like shape of about 1 mm in thickness. The sheet-like chocolate thus obtained or the sheet-like chocolate of Example 2 or Comparative Example 2 was cut into a chocolate sheet of about 7 g in weight. After the chocolate sheet was placed on the hand, about 5 g of "ganache" was placed on the chocolate sheet, wrapped therein, and made round by both hands, resulting in a wrapped-type chocolate-utilizing food. In the case where the sheet-like chocolate of this example or Example 2 was used, the adhesion to hands in making it round was significantly decreased as compared with conventional plastic chocolates using liquid sugar, thereby attaining a considerable improvement in workability. The flavor and mouth feel of the entire chocolate-utilizing food were also favorable as compared with the conventional chocolates using liquid sugar.

However, in the case where the sheet-like chocolate of Comparative Example 2 was used, the chocolate sheet was broken when "ganache" was wrapped in the sheet, thereby making it impossible to obtain a product.

EXAMPLE 9

20 Parts of safflower oil and 80 parts of ethyl behenate were interestrified with a lipase having 1,3-specificity, and the reaction mixture was subjected to removal of ethyl ester portions by distillation. The resulting fat was subjected to single step fractionation to obtain a high-melting fraction (Fat No. 3) with a yield of 58%. Fat No. 3 had the triglyceride composition: $S_2L$, 78.3% ($B_2L$, 71.3%); other $S_2U$, 15.2%; $SU_2+U_3$, 5.1%; and $S_3$, 1.5%.

A sheet-like chocolate was produced in the same manner as that of Example 4, except that Fat No. 3 was used in place of Fat No. 2. The resulting sheet-like chocolate had excellent flexing characteristics.

EXAMPLE 10

The block-like chocolate of Example 8 and "ganache" were successively supplied at a weight ratio of 7:5 to "Rheon Automatic Encrusting Machine (Rheon Automatic Machinery Co., Ltd., Utsunomiya, Japan)", and a product containing the "ganache" wrapped in the chocolate sheet was obtained without difficulty.

EXAMPLES 11-15

Fat No. 2 as described above, cacao oil (having the triglyceride composition: $S_2L$, 5.9%; other $S_2U$, 80.1%; $SU_2+U_3$, 13.0%; and $S_3$, 0.9%), soybean oil, and extremely hardened rapeseed oil were blended at various ratios to prepare test oils. The oil ingredient ratios of the respective test oils are as shown in Table 3.

TABLE 3

|  | Fat No. 2 (wt %) | Cacao oil (wt %) | Soybean oil (wt %) | Coconut oil (wt %) |
| --- | --- | --- | --- | --- |
| Comparative Example 11 | 0 | 0 | 80 | 20 |
| Example 11 | 20 | 0 | 80 | 0 |
| Comparative Example 12 | 80 | 0 | 20 | 0 |
| Example 12 | 40 | 0 | 60 | 0 |
| Comparative Example 13 | 0 | 0 | 30 | 70 |
| Example 13 | 30 | 0 | 30 | 40 |
| Comparative Example 14 | 0 | 10 | 80 | 10 |
| Example 14 | 10 | 10 | 80 | 0 |
| Comparative Example 15 | 0 | 10 | 30 | 60 |
| Example 15 | 30 | 10 | 30 | 30 |

Then, a chocolate was prepared by using the above test oils, and subjected to a coating test for ice cream bars and moisture resistance test for corn cup vessels. That is, 15 parts of cocoa, 25.0 parts of powdered sugar, 60.0 parts of one of the test oils, 0.5 parts of lecithin, and 0.02 parts of vanillin were blended to produce a chocolate by an ordinary method.

The chocolate was warmed to 40° C., and put on an ice cream bar which was on the market, so that the surface thereof was coated with the chocolate. The drying time of the chocolate was measured. The glyceride composition and drying time of the chocolate are shown in Table 4.

TABLE 4

|  | Glyceride composition (wt %) | | | | Test results | | |
| --- | --- | --- | --- | --- | --- | --- | --- |
|  | $S_2U$ | $SU_2+U_3$ | $S_3$ | $S_2L$ in $S_2U$ | Drying time (s) | Soft mouth feel | Softening or melting point (°C.) |
| Comparative Example 11 | 6.7 | 74.8 | 18.5 | 38.8 | 40 | good | 9.4 |
| Example 11 | 23.2 | 76.6 | 0.2 | 77.7 | 15 | good | 15.7 |
| Comparative Example 12 | 73.4 | 25.8 | 0.8 | 84.7 | 10 | good | 30.3 |
| Example 12 | 39.9 | 59.7 | 0.4 | 82.1 | 11 | good | 22.2 |
| Comparative Example 13 | 7.3 | 28.1 | 64.6 | 13.6 | 9 | bad | 21.6 |
| Example 13 | 32.1 | 30.8 | 37.1 | 75.0 | 9 | good | 20.3 |
| Comparative Example 14 | 14.5 | 76.2 | 9.3 | 22.3 | 40 | good | 6.4 |
| Example 14 | 22.8 | 77.0 | 0.2 | 47.9 | 15 | good | 11.0 |
| Comparative Example 15 | 15.2 | 29.4 | 55.4 | 10.4 | 11 | bad | 19.9 |
| Example 15 | 39.8 | 32.1 | 28.1 | 61.8 | 10 | good | 23.4 |

As seen from a comparison of Example 11 and Comparative Example 11 and a comparison of Example 14 and Comparative Example 14, the chocolate containing a larger amount of $SU_2+U_3$ in the oil ingredients and a smaller amount of $S_2L$ exhibited an extremely long drying time. To the contrary, as seen from a comparison of Example 13 and Comparative Example 13 and a comparison of Example 15 and Comparative Example 15, the chocolate containing a smaller amount of $SU_2+U_3$ and a smaller amount of $S_2L$ did not give a soft mouth feel.

Moreover, as seen from a comparison of Comparative Example 12 and Example 12, the chocolate containing too large amount of $S_2U$ gave a soft mouth feel but had a high melting point, so that it had the disadvantage of degrading the property of melting in the mouth for use in frozen desserts.

EXAMPLE 16

Using a 1:1 mixture of the fat obtained in Example 7 and soybean oil, a chocolate was produced in the same manner as that of Examples 11-15. The chocolate thus obtained was applied to the internal wall of a sugar corn cup (having an average weight of 4.7 g), which was on the market, to have a thickness of about 1 mm and solidified to form a chocolate layer thereon. Then, 25 g of ice cream was filled in the sugar corn cup, after which 11 g of the above chocolate was further put on the surface of the ice cream, resulting in an "ice cream-in-sugar corn cup" (i.e., ice cream contained in a sugar corn cup). This "ice cream-in-sugar corn cup" was put in a vinyl plastic bag and stored at −20° C. After 7 and 14 days, the water absorptions of the sugar corn cup were measured, and found to be 3.2% and 4.6%, respectively. The sugar corn cup maintained a crispy sense of eating and had no incompatibility with the ice cream contents so that it maintained the original taste just after the production thereof.

On the other hand, ice cream was directly filled in an uncoated sugar corn cup to produce an "ice cream-in-sugar corn cup" as a control. As described above, after 7 and 14 days, the water absorptions of the sugar corn cup were measured, and found to be 22.8% and 24.8%, respectively. The sugar corn cup exhibited a sticky sense of eating.

EXAMPLE 17

The chocolate of Example 15 was molded into a chocolate sheet of 5 mm in thickness, and cut into cube-like chocolates measuring 5 mm square by a guillotine cutter. These cube-like chocolates were incorporated into ice cream, resulting in a chocolate-utilizing food which had an extremely soft sense of eating and quite satisfactory compatibility with the ice cream.

In the same manner as described above, the chocolate of Comparative Example 15 was used to mold cube-like chocolates which were then incorporated into ice cream. The cube-like chocolates had much incompatibility with the ice cream, so that the chocolate-utilizing food had a rough mouth feel and is therefore unfavorable as an ice cream product.

EXAMPLE 18

A chocolate was prepared in the same manner as that of Example 11, except that Fat No. 3 was used in place of Fat No. 2. The chocolate was filled in an ice cream cell which had been formed with a mold. Then, a stick bar was inserted into the chocolate, after which the upper surface of the chocolate was covered with ice cream, resulting in an ice cream bar containing the chocolate as a center piece. Such a frozen dessert gave extremely good taste because the chocolate was soft and therefore had good compatibility with the ice cream.

As described hereinabove, it is clear that a combination of liquid fat and di-saturated mono-linoleates ($S_2L$) can attain a novel effect of providing a chocolate which not only has a resistance to breakage by bending, i.e., excellent flexing characteristics, but also has excellent moldability. Moreover, even if a considerably large amount of liquid fats are contained, it is possible to obtain a chocolate which is quick to dry. Therefore, the chocolate of the present invention is particularly useful for molding applications and for use in frozen desserts.

What is claimed is:

1. A chocolate having an oil ingredient which comprises 10–85 wt % of di-saturated mono-unsaturated glycerides and 15–90 wt % of di-unsaturated mono-saturated glycerides plus tri-unsaturated glycerides, wherein at least 35 wt % of said di-saturated mono-unsaturated glycerides are di-saturated mono-linoleate.

2. A chocolate according to claim 1, wherein the oil ingredient comprises 30–85 wt % of di-saturated mono-unsaturated glycerides, 15–70 wt % of di-unsaturated mono-saturated glycerides plus tri-unsaturated glycerides, and 0–6 wt % of tri-saturated glycerides, wherein at least 35 wt % of said di-saturated mono-unsaturated glycerides are di-saturated mono-linoleate.

3. A chocolate according to claim 2 which is moldable at room temperature.

4. A chocolate according to claim 1, wherein the oil ingredient comprises 10–70 wt % of di-saturated mono-unsaturated glycerides, 30–90 wt % of di-unsaturated mono-saturated glycerides plus tri-unsaturated glycerides, and 40 wt % or less of tri-saturated glycerides, wherein at least 35 wt % of said di-saturated mono-unsaturated glycerides being di-saturated mono-linoleate, and the softening or melting point of the chocolate oily components is 27° C. or lower.

5. A frozen dessert having a surface which is coated with a chocolate according to claim 4.

6. A chocolate according claim 1 which has a sheet-like shape.

7. A chocolate-utilizing food in which an internal material is wrapped up in a sheet-like chocolate according to claim 6.

8. A frozen dessert having a surface which is coated with a chocolate according to claim 1.

9. A frozen dessert comprising a chocolate according to claim 1 in the center of the dessert.

10. A method for the production of a chocolate-utilizing food comprising the steps of: providing a chocolate having an oil ingredient which comprises 10–85 wt % of di-saturated mono-unsaturated glycerides and 15–90 wt % of di-unsaturated mono-saturated glycerides plus tri-unsaturated glycerides, wherein at least 35 wt % of said di-saturated mono-unsaturated glycerides are di-saturated mono-linoleate; supplying the chocolate together with a material to be wrapped in the chocolate to an apparatus for wrapping the material; and thereby wrapping the material up in the chocolate.

* * * * *